(12) United States Patent
Sun et al.

(10) Patent No.: US 12,554,570 B2
(45) Date of Patent: Feb. 17, 2026

(54) METHOD, APPARATUS AND SYSTEM FOR LOCATING FAULT OF SERVER, AND COMPUTER-READABLE STORAGE MEDIUM

(71) Applicant: INSPUR SUZHOU INTELLIGENT TECHNOLOGY CO., LTD., Jiangsu (CN)

(72) Inventors: Xiuqiang Sun, Shandong (CN); Jiaming Huang, Shandong (CN); Yingliang Qiao, Shandong (CN); Daotong Li, Shandong (CN); Fanyi Yao, Shandong (CN); Xuntang Li, Shandong (CN); Bing Wang, Shandong (CN); Shanbin Ai, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 166 days.

(21) Appl. No.: 18/263,527

(22) PCT Filed: Sep. 28, 2021

(86) PCT No.: PCT/CN2021/121205
§ 371 (c)(1),
(2) Date: Jul. 29, 2023

(87) PCT Pub. No.: WO2022/160756
PCT Pub. Date: Aug. 4, 2022

(65) Prior Publication Data
US 2024/0086269 A1    Mar. 14, 2024

(30) Foreign Application Priority Data
Jan. 29, 2021   (CN) .......................... 202110127034.7

(51) Int. Cl.
*G06F 11/07*   (2006.01)

(52) U.S. Cl.
CPC ...... *G06F 11/0772* (2013.01); *G06F 11/0787* (2013.01); *G06F 11/079* (2013.01)

(58) Field of Classification Search
CPC . G06F 11/0772; G06F 11/0787; G06F 11/079
See application file for complete search history.

(56) References Cited

U.S. PATENT DOCUMENTS 6,148,417 A * 11/2000 da Silva ................ G06F 11/263
714/E11.026
10,628,285 B1 * 4/2020 Kollu ...................... G06F 11/36
(Continued)

FOREIGN PATENT DOCUMENTS

CN    103970626 A    8/2014
CN    107864414 A    3/2018
(Continued)

OTHER PUBLICATIONS

Z. Ping, Y. Wang, Y. Lin, W. Gong, W. Gong and Y. Li, "Design of Server Fault Diagnosis and Prediction Based on BMC," 2024 China Automation Congress (CAC), Qingdao, China, 2024, pp. 1031-1036 (Year: 2024).*

(Continued)

*Primary Examiner* — Ashish Thomas
*Assistant Examiner* — Indranil Chowdhury
(74) *Attorney, Agent, or Firm* — Dennemeyer & Associates LLC

(57) ABSTRACT

A method for locating a fault of a server includes: physically connecting a GPIO pin of a BMC to a GPIO pin of target hardware in advance; reading a current state value of the GPIO signal of the target hardware in a power-on and activation process of a mainboard, and loading a corresponding version of the firmware according to the current state value and the condition for switching; and in response to determining that the corresponding version of the firm- (Continued)

ware is the debug version, outputting serial port log information of the debug version to the BMC, and in response to determining that the corresponding version of the firmware is the release version, determining whether to change the state value of the GPIO signal on a connection between the BMC and the target hardware according to a preset normal activation condition and a system event log.

20 Claims, 4 Drawing Sheets

(56) References Cited

U.S. PATENT DOCUMENTS

| | | | |
|---|---|---|---|
| 11,263,083 B1* | 3/2022 | Lu | G06F 11/1471 |
| 2012/0144180 A1* | 6/2012 | Tang | G06F 13/4282 |
| | | | 713/2 |
| 2012/0159035 A1* | 6/2012 | Yin | G06F 13/385 |
| | | | 710/316 |
| 2016/0261455 A1* | 9/2016 | Su | H04L 41/069 |
| 2017/0220404 A1* | 8/2017 | Polar Seminario | |
| | | | G06F 11/0751 |
| 2018/0031632 A1* | 2/2018 | Blankenburg | G06F 11/3656 |
| 2018/0253368 A1* | 9/2018 | Villarreal | G06F 11/277 |
| 2020/0064402 A1* | 2/2020 | Wu | G06F 11/2236 |
| 2020/0089572 A1* | 3/2020 | Bodner | G06F 11/2284 |
| 2021/0200620 A1* | 7/2021 | Sassara | G06F 13/1668 |
| 2021/0286692 A1* | 9/2021 | Chien | G06F 11/2284 |

FOREIGN PATENT DOCUMENTS

| | | | | |
|---|---|---|---|---|
| CN | 108170476 A | | 6/2018 | |
| CN | 109086155 A | | 12/2018 | |
| CN | 109947611 A | | 6/2019 | |
| CN | 110162436 A | * | 8/2019 | G06F 11/2284 |
| CN | 111722954 A | | 9/2020 | |
| CN | 112948157 A | | 6/2021 | |
| WO | WO-2011063756 A1 | * | 6/2011 | G06F 11/2221 |
| WO | WO-2019080003 A1 | * | 5/2019 | G01R 31/00 |

OTHER PUBLICATIONS

International Search Report for PCT/CN2021/121205 mailed on Jan. 4, 2022.

* cited by examiner

METHOD, APPARATUS AND SYSTEM FOR LOCATING FAULT OF SERVER, AND COMPUTER-READABLE STORAGE MEDIUM

CROSS-REFERENCE TO RELATED APPLICATION

The present disclosure is a National Stage Filing of the PCT International Application No. PCT/CN2021/121205 filed on Sep. 28, 2021, which claims the priority to Chinese Patent Application No. 202110127034.7, filed with the Chinese Patent Office on Jan. 29, 2021 and entitled "Method, Apparatus and System for Locating Fault of Server, and Computer-Readable Storage Medium", which is incorporated in its entirety herein by reference.

TECHNICAL FIELD

The present disclosure relates to the technical field of servers, and in particular to a method, apparatus and system for locating a fault of a server, and a computer-readable storage medium.

BACKGROUND

In a project research and development process of software or hardware, it is common practice to analyze, locate, and solve various problems encountered in the project research and development process by virtue of relevant debugging means, so that a developed project or product may satisfy demand of the market and customers. In the field of servers, higher requirements are raised on safety, reliability, and stability of the product or project. For example, for a data center in which hundreds of thousands of servers are deployed, when a large number of servers are down, crashed, or cannot start normally, the services of the data center will be fatally damaged, and operation and maintenance personnel of the data center will suffer enormous work pressure and loads. In a word, effective debugging plays a significant role in a product research and development process.

Generally, a Basic Input Output System (BIOS) of a server has a release version and a debug version. The debug version is the most commonly-used means for analyzing, locating and clearing a fault in the project or product research and development process. In order to shorten an activation time of a device and to relieve the burden of checking a mechanism principle of a code development and activation flow from the customer, the firmware version that is provided for the customer or provided after the product is launched is mostly the release version.

Since the firmware version of the product is usually the debug version, whenever the product encounters an abnormal situation, for example, when the product is down or cannot start successfully, research and development personnel has to fix the issue on site. The relevant research and development personnel re-updates the firmware of the faulty device to the debug version, and collect debug log information of a relevant BIOS by simulating and recurring the fault. A waste of time and money is caused in terms of a probabilistic problem and a problem solution cycle, and especially, a fatal impact is caused to the servers deployed in batches in the data center. More importantly, when the firmware is updated to the debug version, it is highly possible that the previous fault and fault phenomenon disappear, which is not conducive to problem analyzing and fault locating.

In view of the above, a technical problem of how to efficiently and accurately locate a fault of a faulty device is to be solved by those having ordinary skill in the art.

SUMMARY

A method, apparatus and system for locating a fault of a server, and a computer-readable storage medium are provided, which may efficiently and accurately locate a fault when a server is in an abnormal running state.

Embodiments of the present disclosure provide the technical solutions as follows.

In one aspect of the embodiments of the present disclosure, a method for locating a fault of a server is provided. The method includes: physically connecting a General-Purpose Input/Output (GPIO) pin of a Baseboard Management Controller (BMC) to a GPIO pin of target hardware in advance, and setting, according to a state of a GPIO signal, a condition for switching between a release version and a debug version of firmware;

reading a current state value of the GPIO signal of the target hardware in a power-on and activation process of a mainboard, and loading a corresponding version of the firmware according to the current state value and the condition for switching; and in response to determining that the corresponding version of the firmware is the debug version, outputting serial port log information of the debug version to the BMC, and in response to determining that the corresponding version of the firmware is the release version, determining whether to change the state value of the GPIO signal on a connection between the BMC and the target hardware according to a preset normal activation condition and a system event log.

In some exemplary implementations, determining whether to change the state value of the GPIO signal on the connection between the BMC and the target hardware according to the preset normal activation condition and the system event log includes:

determining whether a startup parameter satisfies the preset normal activation condition in a startup process of the server based on the release version;

in response to determining that the startup parameter of the server does not satisfy the preset normal activation condition, executing a re-activation operation of the server according to a re-activation instruction sent by the BMC, and generating a piece of system event log simultaneously; and in a process of executing the re-activation operation of the server, in response to determining that the startup parameter satisfies the preset normal activation condition and the number of pieces of system event log is not greater than the preset number threshold, powering on and starting up the mainboard of the server; and in response to determining that the startup parameter satisfies the preset normal activation condition and the number of pieces of system event log is greater than the preset number threshold, setting the state value of the GPIO signal on the connection between the BMC and the target hardware to a state value of the GPIO signal that indicates to switch to the debug version for outputting.

In some exemplary implementations, in response to determining that the corresponding version of the firmware is the debug version, outputting the serial port log information of the debug version to the BMC includes:

in response to determining that the corresponding version of the firmware is the debug version, determining whether the server is normally activated through the debug version;

in response to determining that the server is not normally activated through the debug version, outputting the serial port log information of the debug version to the BMC; and in response to determining that the server is normally activated through the debug version, re-executing an activation operation of the server through the release version based on activation parameters of the debug version.

In some exemplary implementations, re-executing the activation operation of the server through the release version based on the activation parameters of the debug version includes:

sending an activation feedback notification instruction to the BMC, so that in response to receiving the activation feedback notification instruction, the BMC executes a shutdown operation of the server, stores activation parameter variables read from a storage region of the debug version to a storage region of the release version upon detecting that the server is in a shutdown state, executes an activation flow of the release version after completing storing the activation parameter variables, normally activates the server, and boots an operating system.

In some exemplary implementations, sending the activation feedback notification instruction to the BMC, so that in response to receiving the activation feedback notification instruction, the BMC executes the shutdown operation of the server includes:

pre-defining a target GPIO pin for the BMC, wherein a change in a state of a signal of the target GPIO pin indicates sending of the activation feedback notification instruction;

sending a GPIO signal instruction to the BMC, wherein the GPIO signal instruction is used for setting a current state value of the signal of the target GPIO pin of the BMC as a target value; and executing the shutdown operation of the server when the BMC detects a change in the current state value of the signal of the target GPIO pin.

In some exemplary implementations, after outputting the serial port log information of the debug version to the BMC, the method further includes:

storing, the BMC, the serial port log information into a target address space in a flash memory of the BMC, and exporting the serial port log information read from the target address space to a requesting terminal upon receiving a fault log information acquisition instruction.

In another aspect of the embodiments of the present disclosure, an apparatus for locating a fault of a server is provided. The apparatus includes:

a hardware connection module, configured to physically connect a GPIO pin of a BMC to a GPIO pin of target hardware, and setting, according to a state of a GPIO signal, a condition for switching between a release version and a debug version of firmware;

a firmware version output determination module, configured to read a current state value of the GPIO signal of the target hardware in a power-on and activation process of a mainboard, and loading a corresponding version of the firmware according to the current state value and the condition for switching;

a fault information storage module, configured to output, in response to determining that the corresponding version of the firmware is the debug version, serial port log information of the debug version to the BMC; and a state value setting module, configured to determine, in response to determining that the corresponding version of the firmware is the release version, whether to change the state value of the GPIO signal on a connection between the BMC and the target hardware according to a preset normal activation condition and a system event log.

In still another aspect of the embodiments of the present disclosure, an apparatus for locating a fault of a server is provided. The apparatus includes a processor and a memory, where the processor is configured to implement operations of the method for locating the fault of the server according to any one of the foregoing embodiments when executing a computer program stored in the memory.

In still another aspect of the embodiments of the present disclosure, a computer-readable storage medium is provided. The computer-readable storage medium stores a program for locating a fault of a server, where the program for locating the fault of the server, when executed by a processor, causes the processor to implement operations of the method for locating the fault of the server according to any one of the foregoing embodiments.

In yet another aspect of the embodiments of the present disclosure, a system for locating a fault of a server is provided. The system includes a BMC, target hardware, and a processor.

A GPIO pin of the BMC is physically connected to a GPIO pin of the target hardware, and the processor is connected to the BMC and the target hardware separately.

The processor is configured to implement operations of the method for locating the fault of the server according to any one of the foregoing embodiments when executing a computer program stored in a memory.

The technical solutions provided in the embodiments of the present disclosure have the advantages as follows. Compared with a setting principle of a release version and a debug version of BIOS firmware, i.e., outputting of debug information is determined by the setting of a macro switch in a code, a state value of a GPIO of the BMC replaces the macro switch in the code of the BIOS, so as to implement a function of switching between the release version and the debug version. By reading a state value of a GPIO of the target hardware in an activation process, the BIOS determines whether to activate firmware of a debug version or firmware of a release version. Based on system event log recorded by the BMC and a normal activation condition, whether to adjust the state value of the GPIO signal may be determined, so as to switch between the two versions of the firmware. After the BIOS performs activation from the debug version, the BMC may rapidly collect, store, and output fault log information of the debug version in different fault scenarios, so as to locate the fault. According to the solution, there is no need to update the firmware in the debug version to clear the fault, there is also no need to simulate and recur the problems of being down and faulty, the debug version may be automatically switched in real time to store the debug log information of the BIOS that encounters the problems of being down and faulty. The stored fault log information may be exported to research and development personnel in a remote manner for analyzing and locating the fault. Therefore, operation and maintenance personnel and the research and development personnel are not required to solve the problems on site, thereby greatly enhancing the large-scale batch deployment and application of an Internet data center, and improving a work efficiency of the operation and maintenance personnel of the data center.

In addition, the embodiments of the present disclosure further provide the corresponding apparatus and system for implementing the method for locating the fault of the server, and the computer-readable storage medium. Accordingly, the method is further made more practical, and the apparatus, system and computer-readable storage medium have similar advantages as the method.

It should be understood that the above general description and the following detailed description are merely exemplary, and do not limit the present disclosure.

BRIEF DESCRIPTION OF THE DRAWINGS

In order to describe the technical solutions in the embodiments of the present disclosure or in the related art more clearly, the accompanying drawings required for describing the embodiments or relevant technologies are briefly described below. Obviously, the accompanying drawings in the following description show merely some embodiments of the present disclosure, and those having ordinary skill in the art can also derive other accompanying drawings from these accompanying drawings without creative efforts.

DETAILED DESCRIPTION

In order to enable those having ordinary skill in the art to better understand the solutions of the present disclosure, the present disclosure is further described in detail below with reference to the accompanying drawings and exemplary embodiments. Apparently, the described embodiments are some embodiments rather than all embodiments of the present disclosure. Based on the embodiments of the present disclosure, all other embodiments derived by those having ordinary skill in the art without making creative efforts fall within the scope of protection of the present disclosure.

The terms "first", "second", "third", "fourth", etc. in the description, claims, and accompanying drawings described above of the present disclosure are used for distinguishing between different objects, instead of describing a particular order. In addition, the terms "comprise", "have", and their variations are intended to cover non-exclusive inclusion. For example, a process, method, system, product, or device including a series of operations or units is not limited to the listed operations or units, but may include operations or units not listed.

Upon the introduction of the technical solutions of the embodiments of the present disclosure, various non-restrictive embodiments of the present disclosure are described in detail below.

Figure 1:
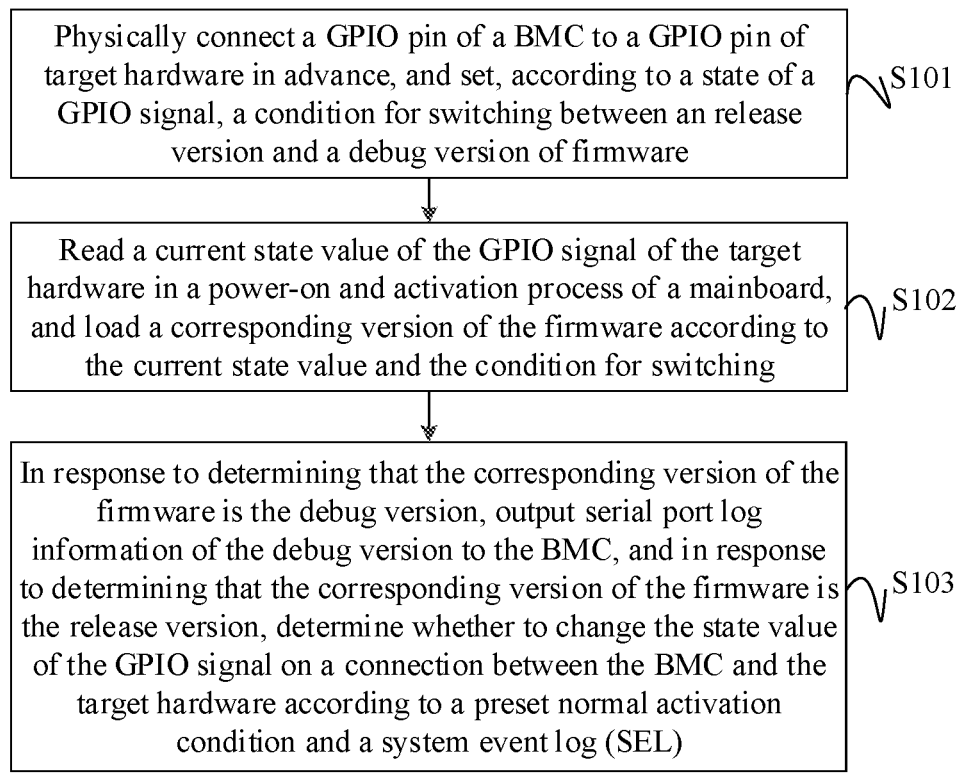
FIG. 1 is a schematic flowchart of a method for locating a fault of a server according to the embodiments of the present disclosure.

FIG. 1 is a schematic flowchart of a method for locating a fault of a server according to the embodiments of the present disclosure. With reference to FIG. 1, the method according to the embodiments of the present disclosure may include the following operations.

At S101, a GPIO pin of a BMC is physically connected to a GPIO pin of target hardware in advance, and a condition for switching between a release version and a debug version of firmware is set according to a state of a GPIO signal.

The target hardware in the embodiments of the present disclosure is any hardware device or chip having a GPIO pin in the server. For example, the target hardware may be a Platform Controller Hub (PCH, which is an integrated south bridge of INTEL CORPORATION®). For another example, for an AMPERE ALTRE® processor with an ADVANCED RISC MACHINE® (ARM®) architecture, which has 24 GPIOs, the target hardware may be the AMPERE ALTRE® processor. When an insufficient number of GPIOs are provided, IO pins may be extended through an IO extension chip PCA9555. For an ADVANCED MICRO DEVICE® (AMD®) MILAN® processor with an X86 architecture, which is configured with pins having a GPIO function, the target hardware may be the AMD MILAN® processor. The firmware may be firmware of any device, such as BMC firmware or BIOS firmware, which has no impact on the implementation of the present disclosure.

Figure 2:
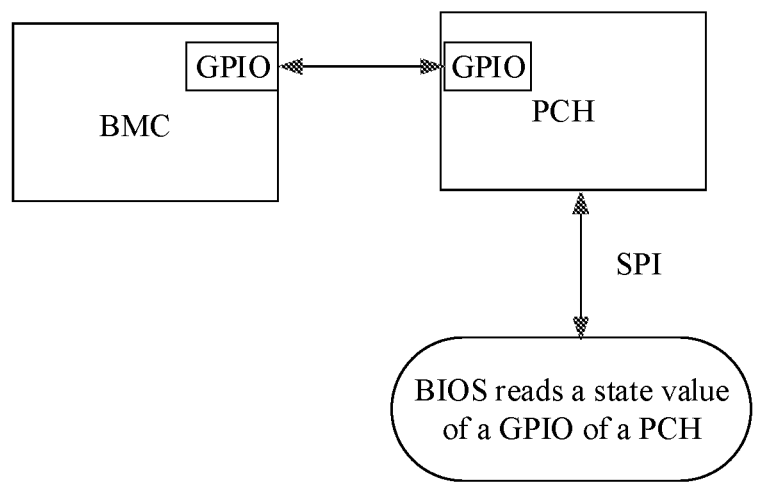
FIG. 2 is a schematic diagram of an exemplary hardware connection framework according to the embodiments of the present disclosure.

It may be understood that when a firmware code of the server, such as a BIOS firmware code, is compiled, whether the debug version or the release version is output is determined through a macro definition. Once the macro definition is fixed, the firmware version is fixed to either the release version or the debug version, and the version cannot be switched, which will result in either no output of debug information or an extremely long activation time of the device. Therefore, the solution in the embodiments of the present disclosure replaces the macro switch in the BIOS code by a state value of a GPIO of the BMC, so as to realize a function of switching between the release version and the debug version. In order to determine whether the debug version or the release version is output based on a change in a state value of a signal of the GPIO pin, firstly, the BMC needs to be physically connected to the target hardware. Taking the PCH serving as the target hardware as an example, the GPIO pin of the BMC needs to be physically connected to the GPIO pin of the PCH in advance, as shown in the hardware connection diagram in FIG. 2. The condition for switching refers to a correspondence between the state of the signal of the GPIO pin and the version currently needs to be output, and the change in the state value of the signal indicates a switch between the two versions of the firmware. For example, when the state value of the signal of the GPIO pin is high, the release version is output, and when the state value of the signal of the GPIO pin is low, the debug version is output. Alternatively, when the state value of the signal of the GPIO pin is high, the debug version is output, and when the state value of the signal of the GPIO pin is low, the release version is output, which will not be limited by the present disclosure in any way.

At S102, a current state value of the GPIO signal of the target hardware is read in a power-on and activation process of a mainboard, and a corresponding version of the firmware is loaded according to the current state value and the condition for switching.

After the BMC is physically connected to the target hardware in S101, the condition for switching is fixed. A type of the version, to be output currently, of the firmware is determined according to the state value of the signal of the GPIO pin of the target hardware and the condition for switching.

At S103, in response to determining that the corresponding version of the firmware is the debug version, serial port log information of the debug version is output to the BMC, and in response to determining that the corresponding version of the firmware is the release version, whether to change the state value of the GPIO signal on a connection between the BMC and the target hardware is determined according to a preset normal activation condition and a system event log (SEL).

In the embodiments of the present disclosure, when the loaded version of the firmware is the debug version, a BIOS will output debug information corresponding to the debug version upon startup. However, when a debug information log is required to be recorded, a terminal is required to collect log information, while in practice, it is impossible for a terminal device to store the debug information. Consequently, the BMC may store the debug information in an address space section in a flash of the BMC. When the fault is required to be analyzed, the cause making the server fail to be normally activated may be rapidly located by exporting the log information through the BMC for analysis.

The preset normal activation condition is a parameter identifying that the server is normally activated without a fault, such as an allowable value or range of a startup duration. The system event log is log information automatically generated by a system when the server fails to be normally activated, that is, when the preset normal activation condition is not satisfied. A piece of system event log is generated whenever the server fails to be normally activated once, and may be stored in the BMC. The number of times that the server fails to be normally activated may be obtained by counting the pieces of system event log. In the embodiments of the present disclosure, whether the server is faulty and whether to output the debug version may be determined according to the preset normal activation condition and the system event log. When it is determined that the server is faulty, the state value of the GPIO signal on the connection between the BMC and the target hardware are changed to a state value of the GPIO signal that indicates to switch to the debug version for outputting. When it is determined that the server is not faulty, the state value of the GPIO signal on the connection between the BMC and the target hardware maintains unchanged.

Compared with a setting principle of a release version and a debug version of BIOS firmware, i.e., outputting of debug information is determined by the setting of a macro switch in a code, in the technical solution according to the embodiments of the present disclosure, a state value of a GPIO of the BMC replaces the macro switch in the code of the BIOS, so as to implement a function of switching between the release version and the debug version. By reading a state value of a GPIO of the target hardware in an activation process, the BIOS determines whether to activate firmware of a debug version or firmware of a release version. Based on system event log recorded by the BMC and a normal activation condition, whether to adjust the state value of the GPIO signal may be determined, so as to switch between the two versions of the firmware. After the BIOS performs activation from the debug version, the BMC may rapidly collect, store, and output fault log information of the debug version in different fault scenarios, so as to locate the fault. According to the solution, there is no need to update the firmware in the debug version to clear the fault, there is also no need to simulate and recur the problems of being down and faulty, the debug version may be automatically switched in real time to store the debug log information of the BIOS that encounters the problems of being down and faulty. The stored fault log information may be exported to research and development personnel in a remote manner for analyzing and locating the fault. Therefore, operation and maintenance personnel and the research and development personnel are not required to solve the problems on site, thereby greatly enhancing the large-scale batch deployment and application of an Internet data center, and improving a work efficiency of the operation and maintenance personnel of the data center.

In the embodiments described above, the way to execute operation S103 is not limited. The current embodiment provides an implementation for adjusting the state value of the GPIO signal, which is conducive to locating of a fault more efficiently and accurately, and includes the following operations.

Whether a startup parameter satisfies the preset normal activation condition is determined in a startup process of the server based on the release version. In response to determining that the startup parameter of the server does not satisfy the preset normal activation condition, a re-activation operation of the server is executed according to a re-activation instruction sent by the BMC, and a piece of system event log is generated simultaneously. In a process of executing the re-activation operation of the server, in response to determining that the startup parameter satisfies the preset normal activation condition and the number of pieces of system event log is not greater than the preset number threshold, the mainboard is powered on and started up; and in response to determining that the startup parameter satisfies the preset normal activation condition and the number of pieces of system event log is greater than the preset number threshold, the state value of the GPIO signal on the connection between the BMC and the target hardware are set to a state value of the GPIO signal that indicates to switch to the debug version for outputting, and a re-activation operation of the server is executed according to the re-activation instruction sent by the BMC. In a process of executing the re-activation operation of the server, in response to determining that the startup parameter still satisfies the preset normal activation condition, the re-activation operation of the server is executed according to a re-activation instruction sent by the BMC, and a piece of system event log is generated simultaneously. In a process of repeatedly executing the re-activation operation of the server, that is, the number of times of executing the re-activation operation exceeds a preset number threshold, for example, 3, it is firstly determined whether the number of pieces of system event log exceeds a preset number threshold; and when the number of pieces of system event log exceeds the preset number threshold, the state value of the GPIO signal on the connection between the BMC and the target hardware are directly set to a state value of the GPIO signal that indicates to switch to the debug version for outputting.

For example, the startup parameter may be an activation time, and the preset normal activation condition may be that the activation time of the server does not exceed a preset time threshold. Correspondingly, the determination of whether the startup parameter satisfies the preset normal activation condition is to determine whether the activation time of the server exceeds the preset time threshold. When the activation time of the server does not exceed the preset time threshold, the startup parameter satisfies the preset normal activation condition. When the activation time of the server exceeds the preset time threshold, the startup parameter does not satisfy the preset normal activation condition. For example, taking the PCH serving as the target hardware as an example, the debug version is output when the state value of the GPIO signal is low. A startup and activation time of the server is set to 6 min by default. The server may be normally activated within 6 min, otherwise the server may be down or faulty. When the activation time exceeds 6 min, the BMC will record a piece of system event log (SEL log), and then automatically re-activate the server. After a re-activation time of the BIOS exceeds the preset time threshold twice, the BMC pulls down a GPIO, connected to the PCH of the mainboard, of the BMC, so as to inform the BIOS that it is required to switch to the debug version for activation.

As an exemplary embodiment of the present disclosure, in order to make it more convenient for the maintenance personnel to locate the fault efficiently and accurately, after the operation that the serial port log information of the debug version is output to the BMC, the method may further include the following operations.

The BMC stores the serial port log information in a target address space in a flash memory of the BMC, and exports the serial port log information read from the target address space to a requesting terminal upon receiving a fault log information acquisition instruction.

The request terminal is a terminal used by the maintenance personnel or the research and development personnel. The maintenance personnel or the research and development personnel may send the fault log information acquisition instruction to the server when requiring fault information. The fault log information acquisition instruction carries information of the requesting terminal. After receiving the instruction, the server sends the serial port log information of the debug version pre-stored in the flash memory of the BMC to the requesting terminal, which is more conducive to fault analyzing and locating.

It may be understood that based on the debug version of the firmware, the server may also be normally activated in certain application scenarios. As another exemplary embodiment of the present disclosure, an implementation process of S103 described above may include the following operations.

In response to determining that the corresponding version of the firmware is the debug version, whether the server is normally activated through the debug version is determined.

In response to determining that the server is not normally activated through the debug version, the serial port log information of the debug version is directly output to the BMC; and in response to determining that the server is normally activated through the debug version, an activation operation of the server is re-executed through the release version based on activation parameters of the debug version. Certainly, before executing the activation operation, the server is required to be shut down, which is common sense and will not be repeated herein.

In the example, when the server is normally activated based on the debug version of the firmware, it is required to send a notification message indicating that the server may be normally activated based on the debug version, that is, an activation feedback notification instruction to the BMC. An operation to be executed corresponding to the activation feedback notification instruction may be pre-stored in the BMC, so that the BMC triggers to execute the corresponding operation after receiving the activation feedback notification instruction. The BMC executes a shutdown operation of the server after receiving the activation feedback notification instruction. After shutdown, the BMC stores activation parameter variables read from a storage region of the debug version to a storage region of the release version upon detecting that the server is in a shutdown state, executes an activation flow of the release version after completing storing the activation parameter variables, normally activates the server, and boots an Operating System (OS). For example, when the firmware is the BIOS, the debug version and the release version are BIOS versions. After being normally activated through the debug version of the BIOS, the server notifies the BMC that the debug version is normally activated, and the OS is booted. In this case, the BMC executes a shutdown action. After shutdown, the BMC reads variable information in a Non-Volatile Random Access Memory (NVRAM) region of the debug version of the BIOS, and stores the variable information to an NVRAM region of the release version of the BIOS. After the storing is completed, the BMC executes an activation flow of the release version of the BIOS, normally activates the server, and boots the OS.

As an exemplary implementation of the embodiments, an implementation process of the operation of sending the activation feedback notification instruction to the BMC, so that the BMC executes a series of subsequent operations including a shutdown operation of the server after receiving the activation feedback notification instruction may include the following operations.

A target GPIO pin is pre-defined for the BMC, wherein a change in a state of a signal of the target GPIO pin indicates sending of the activation feedback notification instruction.

A GPIO signal instruction is sent to the BMC, wherein the GPIO signal instruction is used for setting a current state value of the signal of the target GPIO pin of the BMC as a target value. The target value is a value to which the target GPIO pin is to be set after receiving the GPIO signal and differing from a state value of the signal of the target GPIO pin when not receiving the GPIO signal instruction. The target value is pre-defined and may be carried in the GPIO signal instruction as a parameter.

The BMC executes the shutdown operation of the server upon detecting a change in the state value of the signal of the target GPIO pin, stores the activation parameter variables read from the storage region of the debug version to the storage region of the release version upon detecting that the server is in the shutdown state, executes the activation flow of the release version after the parameters are updated, normally activates the server, and boots the operating system.

For example, the state value of the signal of the target GPIO pin is 0 when not receiving the GPIO signal. The state value of the signal is set to 1 after receiving the GPIO signal. After the BMC detects that the state value of the signal of the target GPIO pin is changed from 0 to 1, it indicates that the activation feedback notification instruction is received. The BMC may set a monitoring thread to monitor the change in a signal state of the target GPIO pin in real time, and triggers the execution of the operations required by the activation feedback notification instruction once the signal state is changed.

As another exemplary embodiment, the BMC may also be notified of the activation feedback notification instruction through an Internal Microprogrammed Interface (IMPI) command.

It may be seen that the above embodiments provide different implementations for whether the server may be normally activated based on the debug version, enriching the functions of the server, improving the user experience, and further improving the performance of the server.

Figure 3:
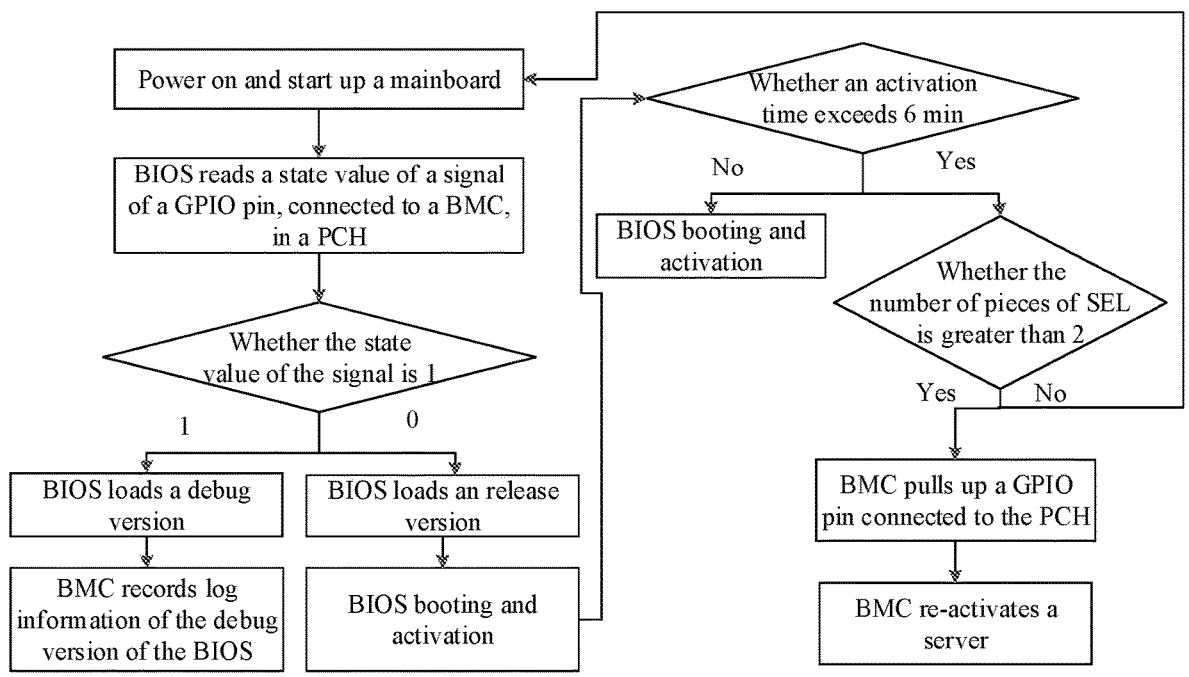
FIG. 3 is a schematic flowchart of another method for locating a fault of a server according to the embodiments of the present disclosure.

In order to enable those having ordinary skill in the art to understand the technical solution of the embodiments of the present disclosure more clearly, the technical solution of the embodiments of the present disclosure is described taking the PCH serving as the target hardware as a schematic example. With reference to FIG. 3, the method may include the following operations.

A GPIO signal, having an input/output function, of a chip of a BMC is physically connected to a GPIO signal of the PCH through hardware of a mainboard. A low signal is taken as a control signal of a release version by default. In the BIOS code, the definitions of the macro definition switch between a debug version and the release version are replaced by assigning, to a macro variable, a state value of the GPIO signal of the PCH.

After the hardware of the mainboard is powered on, the BIOS firstly determines whether to output a debug system by reading the state value of a GPIO of the PCH, that is, when the state of the GPIO is low, the release version is activated by default, and when the state of the GPIO is high, a debug version is activated, and serial port log information of the debug version is output to the BMC. A watchdog time of the BIOS for the power-on and startup of the mainboard is 6 min by default. In a startup process of the release version, the operating system (OS), etc. will be entered within 3 min by default. When the server is down, faulty, etc., which makes a startup and activation time exceeds 6 min, the BMC will trigger a server re-activation action and record one piece of SEL.

After re-activation, the logic of the previous operation is re-executed. When a second timeout occurs, the BMC re-activates the server and records a second piece of SEL. Before a re-activation process, the BMC pulls up a physical GPIO signal connected to the PCH to inform the BIOS that a debug mode is required to perform a serial port log output function.

After startup, the BIOS will check the state value of the GPIO of the PCH. When the state value of the GPIO is high, it means that the serial port log of the debug version is required to be output. In this case, the BIOS will control the macro switch between the debug version and the release version to be turned on, so that serial port log information of the debug version is output, and the BMC will collect and store printed information of the debug version of the BIOS. Research and development personnel analyzes the causes of being down and faulty according to the debug log information output by the BIOS and recorded by the BMC.

It may be seen from the above that in the embodiment, a GPIO pin of the BMC chip is physically connected to a GPIO pin of the PCH, and the BIOS determines whether to activate the firmware in the debug version or the release version by reading the state value of the GPIO of the PCH in the activation process. The definitions of the macro switch between the debug version and the release version are replaced by the state value of the GPIO, so as to switch between the release version and the debug version. Whether the default low state of the GPIO is set to the high state is determined by recording the SEL and determining the number of times of recording the SEL by the BMC, so as to activate the BIOS through the debug version. After the BIOS performs activation from the debug version, the BMC collects and stores the log information of the debug version, so that the research and development personnel may analyze and locate the problem of the serial port log information to determine the cause of the fault.

It is to be noted that there is no strict successive execution order for all the operations in the embodiments of the present disclosure. As long as a logic order is followed, the operations may be executed simultaneously, or in a certain preset order. FIGS. 1 and 3 are merely schematic, and do not denote that the operations are executed in such an order only.

The embodiments of the present disclosure further provide a corresponding apparatus for the method for locating the fault of the server, so as to make the method more practical. The apparatus may be described individually from the view of functional modules and hardware. The apparatus for locating a fault of a server according to the embodiments of the present disclosure is described below. Reference may be made to each other correspondingly for the apparatus for locating a fault of a server described below and the method for locating the fault of the server described above.

Figure 4:
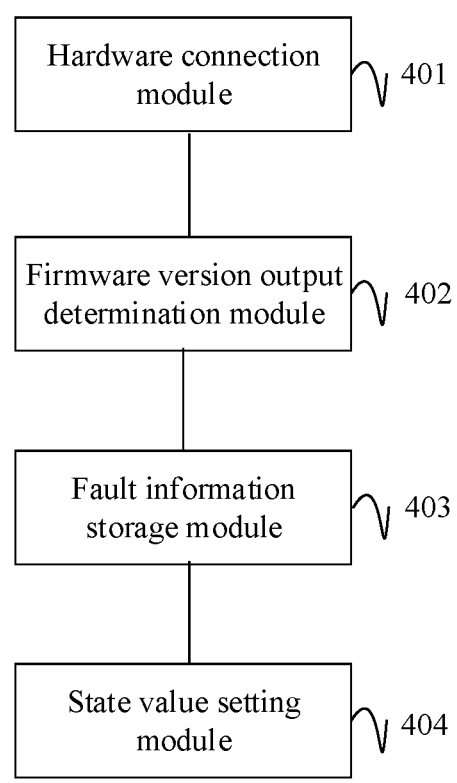
FIG. 4 is a structural diagram of an exemplary implementation of an apparatus for locating a fault of a server according to the embodiments of the present disclosure.

From the view of the functional modules, FIG. 4 is a structural diagram of an exemplary implementation of an apparatus for locating a fault of a server according to the embodiments of the present disclosure. With reference to FIG. 4, the apparatus may include: a hardware connection module 401, configured to physically connect a GPIO pin of a BMC to a GPIO pin of target hardware in advance, and set, according to a state of a GPIO signal, a condition for switching between a release version and a debug version of firmware;

a firmware version output determination module 402, configured to read a current state value of the GPIO signal of the target hardware in a power-on and activation process of a mainboard, and load a corresponding version of the firmware according to the current state value and the condition for switching;

a fault information storage module 403, configured to output, in response to determining that the corresponding version of the firmware is the debug version, serial port log information of the debug version to the BMC; and a state value setting module 404, configured to determine, in response to determining that the corresponding version of the firmware is the release version, whether to change the state value of the GPIO signal on a connection between the BMC and the target hardware according to a preset normal activation condition and a system event log.

In some exemplary implementations of the embodiments, for example, the state value setting module 404 may further include:

a startup condition determination sub-module, configured to determine whether a startup parameter satisfies the preset normal activation condition in a startup process of the server based on the release version;

a re-activation sub-module, configured to execute, in response to determining that the startup parameter of the server does not satisfy the preset normal activation condition, a re-activation operation of the server according to a re-activation instruction sent by the BMC;

a log generation sub-module, configured to generate, in response to determining that the startup parameter of the server does not satisfy the preset normal activation condition, a piece of system event log;

a startup sub-module, configured to, in a process of executing the re-activation operation of the server, in response to determining that the startup parameter satisfies the preset normal activation condition and the number of pieces of system event log is not greater than the preset number threshold, power on and start up the mainboard of the server; and a setting sub-module, configured to set, in response to determining that the startup parameter satisfies the preset normal activation condition and the number of pieces of system event log is greater than the preset number threshold, the state value of the GPIO signal on the connection between the BMC and the target hardware to a state value of the GPIO signal that indicates to switch to the debug version for outputting.

In some other exemplary implementations of the embodiments, for example, the apparatus may further include a fault information exporting module configured to export, upon receiving a fault log information acquisition instruction, the serial port log information read from a target address space to a requesting terminal, wherein the target address space is an address space section in a flash memory of the BMC for storing the serial port log information.

In some exemplary implementations, the fault information storage module 403 described above may further include a normal activation sub-module configured to re-execute, in response to determining that the server is normally activated through the debug version, an activation operation of the server through the release version based on activation parameters of the debug version.

In some exemplary implementations of the embodiments, the normal activation sub-module described above may further be configured to send an activation feedback notification instruction to the BMC, so that in response to receiving the activation feedback notification instruction, the BMC executes a shutdown operation of the server, stores activation parameter variables read from a storage region of the debug version to a storage region of the release version upon detecting that the server is in a shutdown state, executes an activation flow of the release version after completing storing the activation parameter variables, normally activates the server, and boots an operating system. In some other exemplary implementations of the embodiments, the normal activation sub-module described above may further be configured to pre-define a target GPIO pin for the BMC, wherein a change in a state of a signal of the target GPIO pin indicates sending of the activation feedback notification instruction; and send a GPIO signal instruction to the BMC, wherein the GPIO signal instruction is used for setting a current state value of the signal of the target GPIO pin of the BMC as a target value, so that the BMC executes the shutdown operation of the server upon detecting the change in the state value of the signal of the target GPIO pin.

Functions of all the functional modules of the apparatus for locating a fault of a server according to the embodiments of the present disclosure may be particularly implemented through the method in the method embodiments described above, and reference may be made to the relevant description of the method embodiments described above for a particular implementation process, which will not be repeated herein.

It may be seen from the above that in the embodiments of the present disclosure, when the server is in an abnormal running state, the fault may be located efficiently and accurately.

Figure 6:
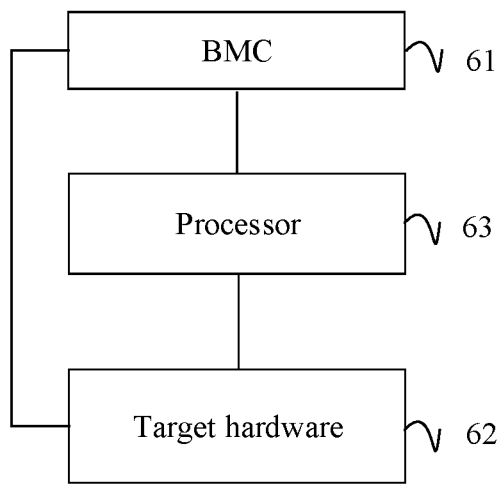
FIG. 6 is a structural diagram of an exemplary implementation of a system for locating a fault of a server according to the embodiments of the present disclosure.

The apparatus for locating a fault of a server mentioned above is described from the view of the functional modules. Further, the embodiments of the present disclosure provide an apparatus for locating a fault of a server, which is described from the view of the hardware. FIG. 6 is a structural diagram of another apparatus for locating a fault of a server according to the embodiments of the present disclosure. As shown in FIG. 6, the apparatus includes a memory 50 configured for storing a computer program, and a processor 51 configured to implement operations of the method for locating the fault of the server according to any one of the embodiments described above when executing the computer program.

The processor 51 may be a 4-core processor, an 8-core processor, etc., including one or more processing cores. The processor 51 may be implemented through at least one hardware form of Digital Signal Processing (DSP), a field-programmable gate array (FPGA), and a Programmable Logic Array (PLA). The processor 51 may also be a main processor and a co-processor. The main processor is a processor configured for processing data in an awakened state, and also referred to as a Central Processing Unit (CPU). The co-processor is a low-power processor configured for processing data in a standby state. In some embodiments, the processor 51 may be provided with a Graphics Processing Unit (GPU) in an integrated manner, the GPU being configured for rendering and drawing a content to be displayed on a display screen. In some embodiments, the processor 51 may further be an Artificial Intelligence (AI) processor, the AI processor being configured for processing a computation operation related to machine learning.

The memory 50 may be one or more computer-readable storage media, the computer-readable storage media being non-transitory. The memory 50 may further be a high-speed random access memory and a non-volatile memory, such as one or more magnetic disk storage devices and flash memory storage devices. In the embodiments, the memory 50 is at least configured for storing the following computer program 501, where the computer program may implement relevant operations of the method for locating the fault of the server disclosed in any of the foregoing embodiments when loaded and executed by the processor 51. Further, resources stored in the memory 50 may further include an operating system 502, data 503, etc., which may be stored temporarily or permanently. The operating system 502 may include WINDOWS®, UNIX®, LINUX®, etc. The data 503 may include, but are not limited to, data corresponding to a result of locating a fault of a server, etc.

In some embodiments, the apparatus for locating a fault of a server may further include a display screen 52, an input/output interface 53, a communication interface 54, a power supply 55, and a communication bus 56.

Figure 5:
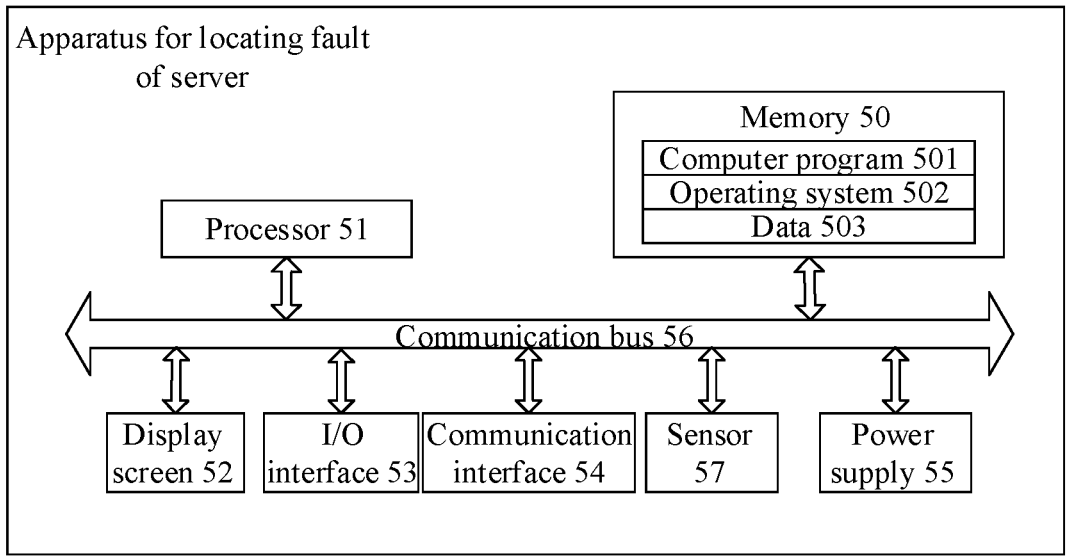
FIG. 5 is a structural diagram of another exemplary implementation of an apparatus for locating a fault of a server according to the embodiments of the present disclosure.

Those having ordinary skill in the art may understand that the structure shown in FIG. 5 does not constitute a limitation on the apparatus for locating a fault of a server, and the apparatus may include more or less assemblies than those shown in the figure. For example, the apparatus may further include a sensor 57.

Functions of all the functional modules of the apparatus for locating a fault of a server according to the embodiments of the present disclosure may be particularly implemented through the method in the method embodiments described above, and reference may be made to the relevant description of the method embodiments described above for a particular implementation process, which will not be repeated herein.

It may be seen from the above that in the embodiments of the present disclosure, when the server is in an abnormal running state, the fault may be located efficiently and accurately.

It may be understood that when the method for locating the fault of the server in the embodiments described above is implemented in the form of a software functional unit and sold or used as an independent product, it may be stored in one computer-readable storage medium. Based on such an understanding, the technical solutions of the present disclosure essentially, or the part that contributes to the related art, or all or some of the technical solutions can be embodied in the form of a software product. The computer software product is stored in one storage medium, and executes all or some of the operations of the method in each embodiments of the present disclosure. The foregoing storage media include various media storing a program code, such as a Universal Serial Bus (USB) flash disk, a mobile hard disk, a Read-Only Memory (ROM), a Random Access Memory (RAM), an electrically erasable programmable ROM, a register, a hard disk, a mobile magnetic disk, a Compact Disk Read-Only Memory (CD-ROM), a magnetic disk, or an optical disk.

In view of that, the embodiments of the present disclosure further provide a computer-readable storage medium, storing a program for locating a fault of a server, where the program for locating the fault of the server, when executed by a processor, causes the processor to implement operations of the method for locating the fault of the server according to any one of the embodiments described above.

Functions of all functional modules of the computer-readable storage medium according to the embodiments of the present disclosure may be particularly implemented through the method in the method embodiments described above, and reference may be made to the relevant description of the method embodiments described above for a particular implementation process, which will not be repeated herein.

It may be seen from the above that in the embodiments of the present disclosure, when a server is in an abnormal running state, a fault may be located efficiently and accurately.

Finally, the embodiments of the present disclosure further provide a system for locating a fault of a server. With reference to FIG. 6, the system for locating a fault of a server may include a BMC 61, target hardware 62, and a processor 63, where a GPIO pin of the BMC 61 is physically connected to a GPIO pin of the target hardware 62, and the processor 63 is connected to the BMC 61 and the target hardware 62 separately; and the processor 63 is configured to implement operations of the method for locating the fault of the server according to any one of the embodiments described above when executing a computer program stored in a memory.

Functions of all functional modules of the system for locating a fault of a server according to the embodiments of the present disclosure may be particularly implemented through the method in the method embodiments described above, and reference may be made to the relevant description of the method embodiments described above for a particular implementation process, which will not be repeated herein.

It may be seen from the above that in the embodiments of the present disclosure, when the server is in an abnormal running state, the fault may be located efficiently and accurately.

Each embodiment in the description is described in a progressive manner, and focuses on differences from other embodiments. Reference can be made to one another for the same and similar portions among all the embodiments. For the apparatuses disclosed in the embodiments, since they correspond to the method disclosed in the embodiments, their descriptions are simplified, and reference can be made to the description of the method for relevant contents.

Those having ordinary skill in the art may further conceive that units and algorithm operations of each example described in combination with the embodiment disclosed herein can be implemented by electronic hardware, computer software, or their combination. In order to clearly illustrate the interchangeability of hardware and software, compositions and operations of each embodiment have been generally described in terms of functions in the description described above. Whether these functions are executed through hardware or software depends on specific applications of the technical solutions and design constraints. Those having ordinary skill in the art can implement the described functions for each particular application through different methods, but such implementation should not be deemed to be beyond the scope of the present disclosure.

The method, apparatus and system for locating a fault of a server, and the computer-readable storage medium provided in the embodiments of the present disclosure are described in detail above. Particular examples are used herein to illustrate the principles and embodiments of the present disclosure, and the description of the above embodiments is only used to assist in understanding the method and core ideas of the present disclosure. It should be noted that those having ordinary skill in the art can also make several improvements and modifications to the present disclosure without departing from the principles of the present disclosure, and these improvements and modifications should also fall within the scope of protection of the claims of the present disclosure.

What is claimed is:

1. A method for locating a fault of a server, the method comprising:

physically connecting a General-Purpose Input/Output (GPIO) pin of a Baseboard Management Controller (BMC) to a GPIO pin of target hardware, and setting, according to a state of a GPIO signal, a condition for switching between a release version and a debug version of firmware;

reading a current state value of the GPIO signal of the target hardware in a power-on and activation process of a mainboard, and loading a corresponding version of the firmware according to the current state value and the condition for switching; and in response to determining that the corresponding version of the firmware is the debug version, outputting serial port log information of the debug version to the BMC, and in response to determining that the corresponding version of the firmware is the release version, determining whether to change the current state value of the GPIO signal on a connection between the BMC and the target hardware according to a preset normal activation condition and a system event log.

2. The method for locating the fault of the server according to claim 1, wherein determining whether to change the current state value of the GPIO signal on the connection between the BMC and the target hardware according to the preset normal activation condition and the system event log comprises:

determining whether a startup parameter satisfies the preset normal activation condition in a startup process of the server based on the release version;

in response to determining that the startup parameter of the server does not satisfy the preset normal activation condition, executing a re-activation operation of the server according to a re-activation instruction sent by the BMC, and generating the system event log simultaneously; and in a process of executing the re-activation operation of the server, in response to determining that the startup parameter satisfies the preset normal activation condition and a number of the system event log is not greater than a preset number threshold, powering on and starting up the mainboard of the server; and in response to determining that the startup parameter satisfies the preset normal activation condition and the number of the system event log is greater than the preset number threshold, setting the current state value of the GPIO signal on the connection between the BMC and the target hardware to a state value of the GPIO signal that indicates to switch to the debug version for outputting.

3. The method for locating the fault of the server according to claim 2, wherein the startup parameter comprises an activation time, and the preset normal activation condition comprises that the activation time of the server does not exceed a preset time threshold.

4. The method for locating the fault of the server according to claim 1, wherein in response to determining that the corresponding version of the firmware is the debug version, outputting the serial port log information of the debug version to the BMC comprises:

in response to determining that the corresponding version of the firmware is the debug version, determining whether the server is normally activated through the debug version;

in response to determining that the server is not normally activated through the debug version, outputting the serial port log information of the debug version to the BMC; and in response to determining that the server is normally activated through the debug version, re-executing an activation operation of the server through the release version based on activation parameters of the debug version.

5. The method for locating the fault of the server according to claim 4, wherein re-executing the activation operation of the server through the release version based on the activation parameters of the debug version comprises:

sending an activation feedback notification instruction to the BMC, so that in response to receiving the activation feedback notification instruction, the BMC executes a shutdown operation of the server, stores activation parameter variables read from a storage region of the debug version to a storage region of the release version upon detecting that the server is in a shutdown state, executes an activation flow of the release version after completing storing the activation parameter variables, normally activates the server, and boots an operating system.

6. The method for locating the fault of the server according to claim 5, wherein sending the activation feedback notification instruction to the BMC, so that in response to receiving the activation feedback notification instruction, the BMC executes the shutdown operation of the server comprises:

pre-defining a target GPIO pin for the BMC, wherein a change in a state of a signal of the target GPIO pin indicates sending of the activation feedback notification instruction;

sending a GPIO signal instruction to the BMC, wherein the GPIO signal instruction is used for setting the current state value of the signal of the target GPIO pin of the BMC as a target value; and executing the shutdown operation of the server when the BMC detects a change in the current state value of the signal of the target GPIO pin.

7. The method for locating the fault of the server according to claim 6, wherein the BMC sets a monitoring thread to monitor the change in the state of the signal of the target GPIO pin in real time, and once the state of the signal is changed, the BMC executes the shutdown operation of the server, stores the activation parameter variables read from the storage region of the debug version to the storage region of the release version upon detecting that the server is in the shutdown state, executes the activation flow of the release version after completing storing the activation parameter variables, normally activates the server, and boots the operating system.

8. The method for locating the fault of the server according to claim 5, wherein an operation that the BMC stores the activation parameter variables read from the storage region of the debug version to the storage region of the release version comprises:

reading, by the BMC, variable information in a Non-Volatile Random Access Memory (NVRAM) region of the debug version of a BIOS, and stores the variable information to an NVRAM region of the release version of the BIOS.

9. The method for locating the fault of the server according to claim 5, wherein sending the activation feedback notification instruction to the BMC comprises:

sending the activation n feedback notification instruction through an Internal Microprogrammed Interface (IMPI) command.

10. The method for locating the fault of the server according to claim 1, wherein after outputting the serial port log information of the debug version to the BMC, the method further comprises:

storing, by the BMC, the serial port log information into a target address space in a flash memory of the BMC, and exporting the serial port log information read from the target address space to a requesting terminal upon receiving a fault log information acquisition instruction.

11. An apparatus for locating a fault of a server, the apparatus comprising: a processor and a memory, wherein the processor is configured to implement operations of the method for locating the fault of the server according to claim 1 when executing a computer program stored in the memory.

12. The method for locating the fault of the server according to claim 1, wherein the target hardware is a hardware device or chip having a GPIO pin in the server, and the target hardware comprises: a Platform Controller Hub (PCH), an Ampere Altre® processor, or an AMD Milan® processor.

13. The method for locating the fault of the server according to claim 1, wherein the firmware comprises BMC firmware or Basic Input Output System (BIOS) firmware.

14. The method for locating the fault of the server according to claim 1, wherein the condition for switching between the release version and the debug version of the firmware comprises a correspondence between the state of the GPIO signal and the corresponding version of the firmware currently needs to be output.

15. The method for locating the fault of the server according to claim 1, further comprising: locating a fault of the server based on the serial port log information stored in the BMC.

16. The method for locating the fault of the server according to claim 1, wherein the preset normal activation condition comprises a parameter identifying that the server is normally activated without a fault, and the parameter comprises: an allowable value or range of a startup duration.

17. A non-transitory computer-readable storage medium, storing a program for locating a fault of a server, wherein the program for locating the fault of the server, when executed by a processor, causes the processor to implement following operations:
   physically connecting a General-Purpose Input/Output (GPIO) pin of a Baseboard Management Controller (BMC) to a GPIO pin of target hardware, and setting, according to a state of a GPIO signal, a condition for switching between a release version and a debug version of firmware;
   reading a current state value of the GPIO signal of the target hardware in a power-on and activation process of a mainboard, and loading a corresponding version of the firmware according to the current state value and the condition for switching; and
   in response to determining that the corresponding version of the firmware is the debug version, outputting serial port log information of the debug version to the BMC, and in response to determining that the corresponding version of the firmware is the release version, determining whether to change the current state value of the GPIO signal on a connection between the BMC and the target hardware according to a preset normal activation condition and a system event log.

18. A system for locating a fault of a server, the system comprising: a Baseboard Management Controller (BMC), target hardware, and a processor, wherein
   a General-Purpose Input/Output (GPIO) pin of the BMC is physically connected to a GPIO pin of the target hardware, and the processor is connected to the BMC and the target hardware separately; and
   the processor is configured to implement following operations when executing a computer program stored in a memory:
   setting, according to a state of a GPIO signal, a condition for switching between a release version and a debug version of firmware;
   reading a current state value of the GPIO signal of the target hardware in a power-on and activation process of a mainboard, and loading a corresponding version of the firmware according to the current state value and the condition for switching; and
   in response to determining that the corresponding version of the firmware is the debug version, outputting serial port log information of the debug version to the BMC, and in response to determining that the corresponding version of the firmware is the release version, determining whether to change the current state value of the GPIO signal on a connection between the BMC and the target hardware according to a preset normal activation condition and a system event log.

19. The system for locating the fault of the server according to claim 18, wherein the GPIO pin of a chip of the BMC is physically connected to the GPIO pin of the target hardware through hardware of a mainboard.

20. The system for locating the fault of the server according to claim 18, wherein the target hardware is a hardware device or chip having a GPIO pin in the server, and the target hardware comprises: a Platform Controller Hub (PCH), an Ampere Altre® processor, or an AMD Milan® processor.

* * * * *